Patented Aug. 30, 1949

2,480,242

UNITED STATES PATENT OFFICE 2,480,242

PURIFICATION OF NAPHTHENE HYDROCARBONS

Alfred E. Hirschler, Drexel Hill, Pa., assignor to Sun Oil Company, Philadelphia, Pa., a corporation of New Jersey No Drawing. Application May 27, 1946, Serial No. 672,685

6 Claims. (Cl. 260—666)

This invention relates to the separation of hydrocarbons and is particularly directed to a method of preparing a naphthene hydrocarbon of relatively high purity from a mixture comprising the same together with one or more paraffin hydrocarbons.

In the preparation of individual hydrocarbons by organic synthesis, it is seldom that the desired hydrocarbon may be produced directly in a high state of purity. Generally a mixture of hydrocarbons is formed, which includes compounds which may boil relatively close to the desired hydrocarbon. A usual procedure of purification involves distillation under fractionating conditions whereby removal of compounds having boiling points sufficiently different from that of the desired hydrocarbon may be accomplished. It is often the case, however, that a high degree of purity may not be attained in this manner, or may be obtained only with great difficulty, due to the proximity of boiling points of the various compounds. Likewise, in the separation of a particular hydrocarbon from a complex hydrocarbon mixture such as petroleum or coal tar fractions, it is often extremely difficult to segregate the desired component as a product of high purity due to the presence of other compounds of close boiling points. While the use along with straight distillation of other procedures, such as solvent extraction and azeotropic distillation, has resulted in improved separations in certain cases, generally speaking it has not been practical heretofore to produce hydrocarbons of high purity from mixtures containing closely related hydrocarbons. Usually the best that has been done from a practical aspect is to prepare hydrocarbons of technical purity, such as in concentrations in the order of 80% to 95%. To produce hydrocarbons in a high state of purity, for example in concentrations better than 95%, from mixtures containing close boiling compounds heretofore has been extremely difficult and, in many cases, practically impossible.

The present invention provides an improved method whereby relatively pure hydrocarbons of the naphthenic class may be prepared from a starting material comprising the desired naphthene, preferably in predominant amount, together with one or more paraffin hydrocarbons. The method is particularly useful where the components in the starting mixture boil closely together, as where they have the same number of, or differ by not more than one or two, carbon atoms per molecule. The purification is accomplished according to the invention by selective adsorption of the paraffin from the naphthene, utilizing activated carbon as the adsorbent.

The removal of a paraffin hydrocarbon from a naphthene by selective adsorption of the paraffin on activated carbon, so as to obtain the naphthene in a relatively high state of purity, does not appear to have been accomplished heretofore. I have found that activated carbon is capable of removing the paraffinic component from some mixtures of this type regardless of the concentration of the paraffin in the mixture. This is particularly true where the paraffin is a straight chain compound. For example, n-hexane-cyclohexane, n-heptane-methylcyclohexane, and n-octane-ethylcyclohexane are mixtures from which activated carbon will selectively remove the paraffin substantially regardless of the proportion of paraffin in the mixture.

I have further found that there are many other paraffin-naphthene mixtures from which activated carbon will not selectively adsorb the paraffin when present in large proportion, but will, however, selectively remove the paraffin when its proportion is not too great in the mixture. Paraffins which are branched chain, but not too highly so, tend to form this type of mixture. When the behavior is of this type, the naphthene may be purified by starting with a mixture containing the paraffinic component in a proportion substantially less than that at which the naphthene is selectively adsorbable and then treating such mixture with activated carbon. Preferably, the starting mixture should contain a predominant amount of the naphthene and only a minor amount of the paraffin. The smaller the amount of the paraffin the more easily its removal may be effected. This is in contrast to other separation methods such as distillation or solvent extraction wherein the separation becomes more difficult as the amount of a component decreases.

There are still other paraffin-naphthene mixtures from which activated carbon is incapable of selectively adsorbing the paraffin even when it is present in low concentration. The tendency is toward this type of behavior when the paraffinic component is a highly branched chain compound. An example of this type of mixture is 2,2,4-trimethylpentane-methylcyclohexane, wherein the naphthene is the more strongly adsorbable component throughout the whole concentration range. On the other hand, 2,2,3-trimethylbutane is adsorbable on activated carbon from a mixture of the same with cyclohexane provided the 2,2,3-trimethylbutane content is below about 20-25%. This shows that the fact that a paraffin has a highly branched chain does not necessarily mean that it will not be removable from a naphthene with which it is associated.

It has not been possible thus far to predict with absolute certainty just which type of behavior will be encountered for any given combination of a paraffin and a naphthene. In order to be certain that the present method is applicable for any given mixture, it is best to predetermine that the paraffin actually will be selectively adsorbable at the concentration at which it occurs in the starting mixture.

In practicing the invention, a charge material is selected which contains the paraffinic component in a proportion at which it is selectively adsorbable. Preferably the charge should contain a large amount of the desired naphthene and only a small amount (say 20% or less) of the paraffin as impurity. This mixture is then treated with activated carbon to selectively adsorb the paraffinic component. In order to effect a high degree of separation, the treatment is carried out preferably by percolating the charge through a column of the adsorbent while employing a large proportion of the adsorbent. After all of the charge has passed into the adsorbent, it may be followed by a desorbing agent comprising a material more strongly adsorbable by activated carbon than the adsorbate in order to effect displacement of the charge material from the adsorbent. Examples of suitable desorbing agents are benzene, toluene, xylene, phenol or other aryl compounds. A relatively low boiling aliphatic hydrocarbon such as butane or pentane also may be employed as the desorbing agent, particularly when the charge material is sufficiently high boiling to be readily separable therefrom by distillation. A desorbing agent is not required, however, if sufficient charge is used to wet all of the adsorbent and produce a filtrate. The first portion of efflux or filtrate from the column will comprise the naphthene in a relatively high state of purity as compared to the charge. Succeeding portions will decrease in purity and, as the adsorbate is displaced from the gel, the filtrate will become less pure than the charge. The filtrate from the column may be cut into fractions as desired in order to segregate the portion containing the naphthene in the purity desired.

The following examples, in which percentages are by volume, will serve to illustrate more specifically how the invention may be practiced.

Example I

A column having an internal diameter of about ½ inch and a height of 3 feet was packed with 50 grams of 60-90 mesh activated carbon. The column was provided with a water jacket through which water was continuously circulated at a temperature of about 45-50° F. to absorb heat generated due to wetting of the adsorbent. Sixty milliliters of a starting mixture consisting of 90% methylcyclohexane and 10% n-heptane were percolated down through the column. After all of the charge had passed into the adsorbent, it was followed by benzene to displace the charge material from the column. The filtrate was collected in fractions and the composition of each fraction was determined. The first fraction amounting to 22% of the charge was substantially 100% pure methylcyclohexane. The next fraction (22-38% of charge) was 97.5% pure. About 50% of the total filtrate contained methylcyclohexane in a concentration higher than that of the charge.

Example II

In this example a mixture consisting of 90% cyclohexane and 10% 2,2,3-trimethylbutane was treated in the same manner as described in Example I except that 49 milliliters of charge were used. Two 10% fractions of filtrate were obtained and were found to contain respectively 93% and 91.5% cyclohexane. Further purification could have been effected by retreating the fractions with activated carbon.

Example III

A mixture consisting of 90% ethylcyclohexane and 10% n-octane was treated in the manner described in Example I except that 49 milliliters of charge were used. The first cut amounting to 20% of the change was substantially 100% pure ethylcyclohexane. The second cut (20-41% of charge) was 96% pure. A total of about 73% was obtained with an ethylcyclohexane content higher than that of the charge.

Example IV

Forty-nine milliliters of a mixture consisting of 92.5% cyclohexane and 7.5% n-hexane were treated in the manner previously described. The first 55% cut of the filtrate was 99.8% pure cyclohexane.

In practicing the invention it generally will be desirable to reactivate the adsorbent after it has been used in order that it may be used again. This may be done by blowing the adsorbent with hot inert gas or air to drive off the adsorbed hydrocarbons or to drive off the desorbing agent if one has been used.

The temperature at which the adsorption operation is carried out may affect the efficiency of the separation and it often will be the case that a poorer separation will be obtained at elevated temperature. The operation therefore is preferably conducted at room temperature or below to insure a better separation. This generally will necessitate the provision of some means for removing any heat generated due to wetting of the adsorbent as, for instance, by providing means for circulating a cooling medium around the adsorbent column.

In my copending application, Serial No. 643,764, filed January 26, 1946, now U. S. Patent No. 2,464,981, there is described and claimed a method for removing paraffin hydrocarbons from naphthenes wherein the adsorbent is silica gel or other adsorbent substantially conforming to silica gel in adsorptive properties. The activated carbon used according to the present method is an adsorbent of a different type and generally would not be considered as having properties substantially equivalent to those of silica gel. Activated carbon is organophilic whereas adsorbents such as silica gel are hydrophilic. Accordingly, in many cases activated carbon exhibits adsorptive properties substantially different from those of silica gel; and in fact, for many hydrocarbon systems the activated carbon gives substantially improved results.

Various modifications of the herein described process are permissible within the broad aspects of the invention and will be apparent to those skilled in the art.

Having described my invention, what I claim and desire to protect by Letters Patent is:

1. A process for purifying a naphthene hydrocarbon from a non-aromatic liquid mixture composed of a major amount of said naphthene hydrocarbon and a minor amount of a straight chain paraffin hydrocarbon which comprises filtering the mixture through a body of activated carbon, thereby selectively adsorbing said paraffin hydrocarbon, and separating from the adsorbent a filtrate fraction containing the naphthene hydrocarbon in more nearly pure form.

2. A process according to claim 1, wherein the said hydrocarbons differ by not more than two carbon atoms per molecule.

3. A process according to claim 1 wherein the said hydrocarbons contain the same number of carbon atoms per molecule.

4. A process for purifying a naphthene hydrocarbon from a non-aromatic liquid mixture composed of a major proportion of said naphthene hydrocarbon and a minor proportion of a paraffin hydrocarbon, said major proportion of the naphthene being in excess of any proportion at which the naphthene is selectively adsorbable, which comprises filtering the mixture through a body of activated carbon, thereby selectively adsorbing said paraffin hydrocarbon, and separating from the adsorbent a filtrate fraction containing the naphthene hydrocarbon in more nearly pure form.

5. A process according to claim 4 wherein the said hydrocarbons differ by not more than two carbon atoms per molecule.

6. A process according to claim 4 wherein the said hydrocarbons contain the same number of carbon atoms per molecule.

ALFRED E. HIRSCHLER.

REFERENCES CITED

The following references are of record in the file of this patent:

UNITED STATES PATENTS

| Number | Name | Date |
|---|---|---|
| 2,415,315 | Walter et al. | Feb. 4, 1947 |
| 2,425,535 | Hibshman | Aug. 12, 1947 |

OTHER REFERENCES

Cawley, Jour. Soc. Chem. Ind., vol. 60, 205–7 (1941).

Mair et al., The Oil and Gas Journal, September 19, 1935, pages 29, 30, 32.

Mair et al., Jour. Res. Nat. Bur. Stand., vol. 32, 165–183 (1944).